United States Patent
Saha (10) Patent No.: US 12,507,142 B2
(45) Date of Patent: Dec. 23, 2025

(54) DYNAMIC SWITCHING BETWEEN A HOME NETWORK AND A ROAMING NETWORK BASED ON DATA CONNECTIVITY IN THE HOME NETWORK

(71) Applicant: Boost SubscriberCo L.L.C., Englewood, CO (US)

(72) Inventor: Sougata Saha, Aurora, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 427 days.

(21) Appl. No.: 18/306,371

(22) Filed: Apr. 25, 2023

(65) Prior Publication Data

US 2024/0365193 A1 Oct. 31, 2024

(51) Int. Cl.
*H04W 36/14* (2009.01)
*H04W 36/30* (2009.01)

(52) U.S. Cl.
CPC ..... *H04W 36/1446* (2023.05); *H04W 36/305* (2018.08)

(58) Field of Classification Search
CPC ............... H04W 36/1446; H04W 36/305
See application file for complete search history.

(56) References Cited

U.S. PATENT DOCUMENTS

| 11,070,974 B2* | 7/2021 | Dodd-Noble | H04W 76/12 |
| 2013/0089022 A1* | 4/2013 | Lu | H04W 36/08 |
| | | | 370/315 |
| 2016/0127884 A1* | 5/2016 | Kim | H04W 60/04 |
| | | | 455/435.2 |

OTHER PUBLICATIONS

5G NR SA Registration/Attach Call Flow, https://www.techplayon.com/5g-nr-sa-registration-attach-call-flow/; Printed Apr. 5, 2023.
Sultan, Alain, 5G System Overview, https://www.3gpp.org/technologies/5g-system-overview, Printed Apr. 5, 2023.

* cited by examiner

*Primary Examiner* — Justin Y Lee
(74) *Attorney, Agent, or Firm* — Baker Botts L.L.P.

(57) ABSTRACT

A system comprises a home network including a Radio Access Network and a core network, a roaming network, and a User Equipment (UE) subscribing to the home network and the roaming network. The UE is configured to determine, while connected to a control plane of the core network, that the UE is not connected to a user plane of the core network. In response, the UE connects to the roaming network. While connected to the roaming network, the UE periodically attempts to connect to the home network. The UE switches back to the home network upon successfully connecting to the control plane and the user plane of the core network.

20 Claims, 4 Drawing Sheets

DYNAMIC SWITCHING BETWEEN A HOME NETWORK AND A ROAMING NETWORK BASED ON DATA CONNECTIVITY IN THE HOME NETWORK

TECHNICAL FIELD

The present disclosure relates generally to wireless communications, and more specifically to dynamic switching between a home network and a roaming network based on data connectivity in the home network.

BACKGROUND

In accordance with 5th Generation (5G) New Radio (NR) standards, a User Equipment (UE) connects to a 5G network (e.g., a home network) using a 5G attach procedure. The 5G attach procedure includes the UE first registering with a 5G core associated with the 5G core network. Once the UE is successfully registered with the 5G core, the UE, as part of the 5G attach procedure, then establishes a data session that allows the UE to transmit and receive data using the 5G network. In some cases, after registering with the 5G core, the UE is unable to establish the data session. This means that while the UE is registered with the 5G core, the UE is still unable to exchange data using the 5G network. This puts the UE in an exception state where the UE, in spite of being registered with the 5G core, cannot access data services and further cannot handover to a roaming network.

SUMMARY

The system and methods implemented by the system as disclosed in the present disclosure provide dynamic switching between a home network and a roaming network when data services are unavailable to a UE. The disclosed system and methods provide several practical applications and technical advantages. For example, the disclosed system provides the practical application of intelligently switching a UE from a home network to a roaming network when the UE is unable to access data services in the home network. As described in embodiments of the present disclosure, the UE is configured to handle an exception state when the UE successfully registers with the 5G core network as part of the 5G attach procedure but is thereafter unable to establish a data session. When the UE, while registered with the 5G core network associated with a home network, detects that the UE does not have a data connection to the data network, the UE connects to (e.g., handover to) a roaming network. The UE determines that the UE does not have a data connection in response to receiving a Protocol Data Unit (PDU) Session Establishment Reject message from the 5G core network. Switching to the roaming network allows the UE to access the data network via the roaming network. While connected to the roaming network, the UE periodically attempts to re-connect to the home network using the 5G attach procedure from scratch and switches back to the home network when the UE successfully registers with the 5G core network and further successfully completes a PDU session establishment (e.g., receives a PDU Session Establishment Accept message from the 5G core network). This procedure allows the UE to switch to the roaming network when a data session cannot be established in the home network, and then switch back to the preferred home network as soon as a PDU session can be established in the home network. Switching to the roaming network allows the UE to avoid being in the exception state described above and further avoids interruption in data service. Further, switching back to the home network as soon as a data session can be established in the home network allows the UE to minimize connection time with the roaming network and to avail of the higher level of service (e.g., higher data rates) and/or cheaper service provided by the preferred home network.

By bringing the UE out of the exception state in response to detecting that the UE failed to establish a data session in the 5G network, the disclosed system and method save processing, memory and battery resources that would otherwise be spent by the UE to continually attempt to access data services in the 5G network. Further, by causing the UE to connect back to the preferred 5 home network that may provide a higher data throughput when a data session can be established with the home network, the disclosed system and method may improve the average data throughput of the UE by maximizing the UE connectivity with the home network. Thus, the disclosed system and method generally improve the performance of the UE. The disclosed system and method further improve cellular communication technology including 5G NR technology.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
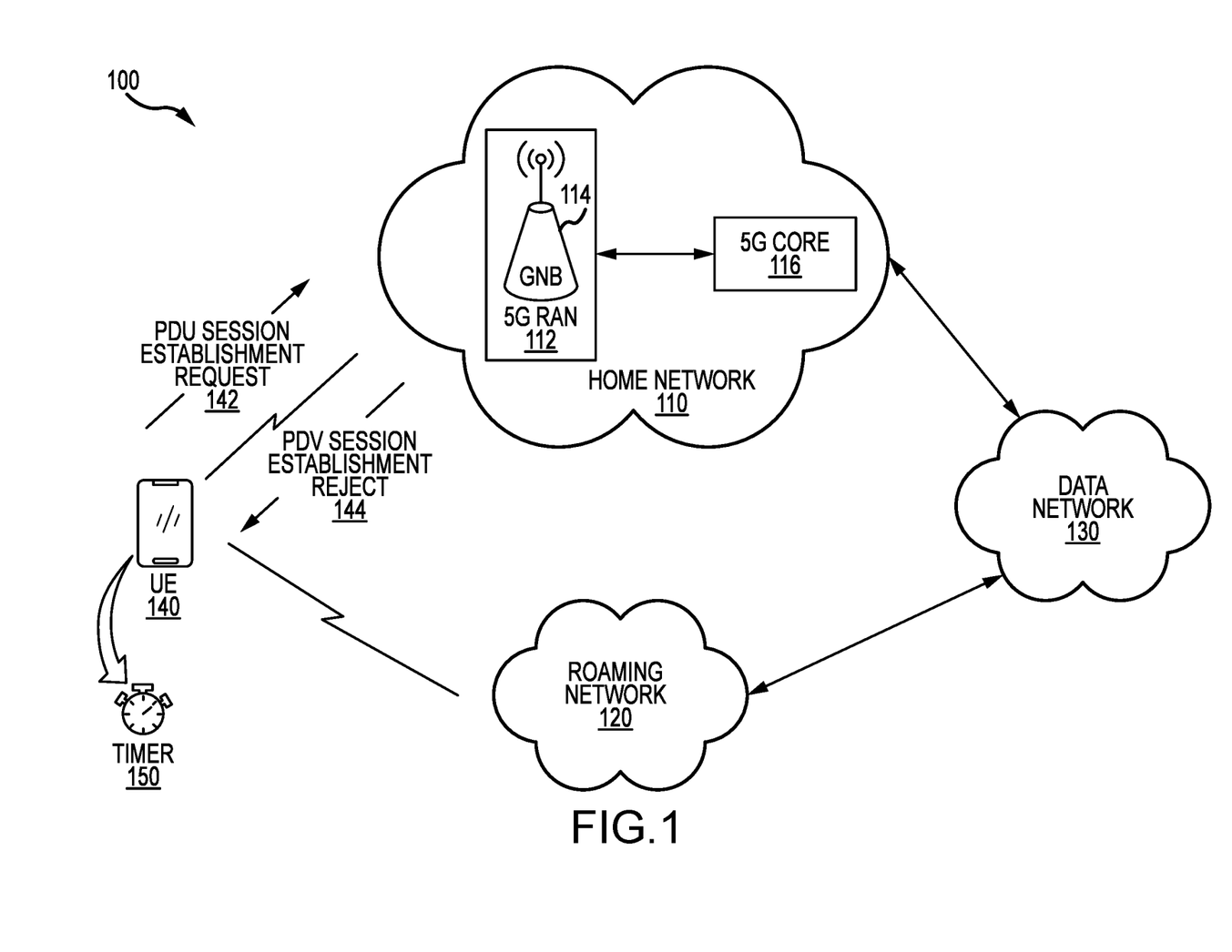
FIG. 1 illustrates an example cellular communication system, in accordance with embodiments of the present disclosure.

FIG. 1 illustrates an example cellular communication system 100, in accordance with embodiments of the present disclosure. As shown in FIG. 1, cellular communication system 100 may include a User Equipment (UE) 140, a home network 110, a roaming network 120, and a data network 130. The home network 110 and the roaming network 120 are connected to the data network 130 and may facilitate UEs (e.g., UE 140) connected to the respective networks 110 and 120 to access the data network 130. The UE 140 may be subscribed to access the home network 110 as well as the roaming network 120. For example, the UE 140 may access the data network 130 by via the home network 110 and/or the roaming network 120. In certain embodiments, home network 110 may be configured as a preferred network of the UE 140. This may mean that the UE 140 connects to the home network 110 when available and switches to the roaming network 120 when the home network 110 is unavailable. In one embodiment, the home network 110 may provide a higher level of service and/or cheaper service to the UE 140 as compared to the roaming network 120. For example, the home network 110 may provide higher downlink and/or uplink data rates to the UE 140 as compared to the roaming network 120. In another example, the home network 110 may provide one or more services to the UE 140 as cheaper rates a compared to the roaming network 120. Services provided by each of the home network 110 and the roaming network 120 may include access to data network 130 (e.g., Internet access), data reporting, telephone calls, text messaging services, etc.

Data network 130, in general, may be a wide area network (WAN), a personal area network (PAN), a cellular network, or any other technology that allows devices to communicate electronically with other devices. In one or more embodiments, the data network 130 may be the internet. UE 140 may be a computing device (e.g., desktop computer, laptop computer, tablet computer, smart phone etc.) that can be operated by a user and communicate with other devices connected to the network 130.

Figure 2:
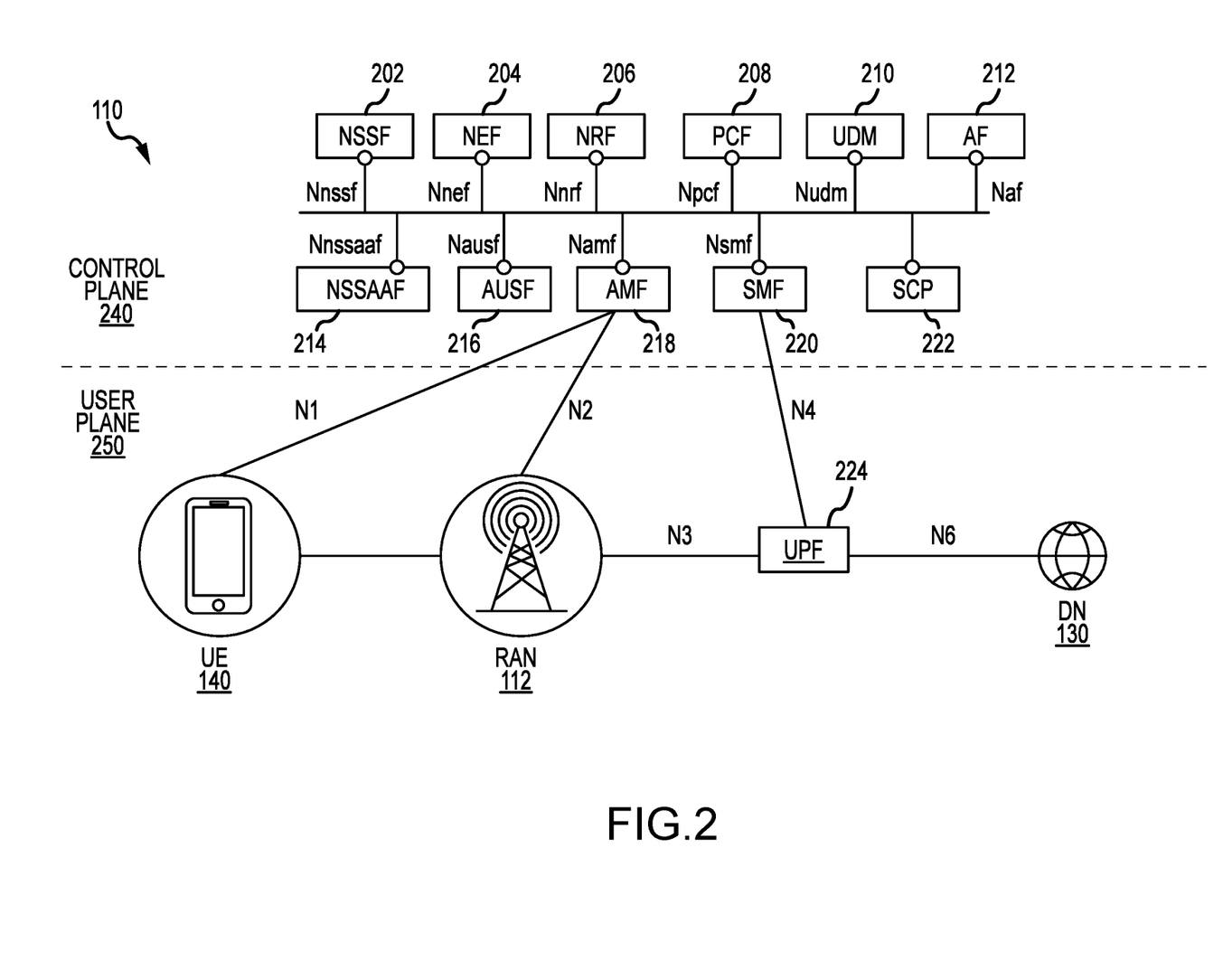
FIG. 2 illustrates an example architecture of the home network, in accordance with embodiments of the present disclosure.

In one or more embodiments, the home network 110 is a 5th Generation (5G) network including a 5G Radio Access Network (RAN) 112 and a 5G core network 116. The 5G RAN 112 includes a plurality of gNBs 114, where "g" stands for "5G" and "NB" for "Node B", which is a name inherited from 3G onwards to refer to a radio transmitter. As illustrated in FIG. 2 and describe below, the architecture of the 5G core 116 relies on a "Service-Based Architecture" (SBA) framework, where the architectural elements are defined in terms of "Network Functions" (NFs) rather than by traditional network entities. Via interfaces of a common framework, any given NF offers its services to all the other authorized NFs and/or to any consumers that are permitted to make use of these provided services. Such an SBA approach offers modularity and reusability.

Roaming network 120 may include a 5G network, a 4G Long Term Evolution (LTE) cellular network or any other radio access technology.

It may be noted that while the home network 110 is described in the context of a 5G NR radio network that uses gNodeBs 114 as base stations, the embodiments detailed herein can be applicable to the home network 110 including other types of cellular networks, such as a 4G Long Term Evolution (LTE) cellular network, that uses eNodeBs in place of gNodeBs. In one or more embodiments, home network 110 operates according to the 5G NR radio access technology (RAT). In other embodiments, a different RAT may be used, such as 3G, 4G Long Term Evolution (LTE), or some other RAT.

FIG. 2 illustrates an example architecture of the home network 110, in accordance with embodiments of the present disclosure. As described above with reference to FIG. 1, the home network 110 be a 5G network that includes 5G RAN 112 and 5G core 116. 5G RAN 112 typically includes a network of gNBs 114, wherein each gNB 114 provides connectivity between a UE 140 and the 5G core network 116. A gNB 114 is responsible for all radio-related functions in a respective radio cell serviced by the gNB 114. As described above, 5G core network 116 implements several network functions, wherein each network function provides a specific set of services. FIG. 2 illustrates several such network functions that may make up the 5G core network 116 including Network Slice Selection Function (NSSF) 202, Network Exposure Function (NEF) 204, Network Repository Function (NRF) 206, Policy Control Function (PCF) 208, Unified Data Management (UDM) 210, Application Function (AF) 212, Network Slice Specific Authentication and Authorization Function (NSSAF) 214, Authentication Server Function (AUSF) 216, Access and Mobility Management Function (AMF) 218, Session Management Function (SMF) 220, Service Communication Proxy (SCP) 222 and User Plane Function (UPF) 224. The network functions shown in FIG. 2 are likely to be used in most of the 5G networks but depending on real deployment there may be more components or in some cases (e.g., small scale private networks) there may be less components where multiple functionalities are aggregated into one component. Each network function shown in FIG. 2 may be implemented by one or more computer processors (e.g., one or more computing servers).

As shown in FIG. 2, the network functions of the 5G core network 116 are logically split into a control plane 240 and a user (or data) plane 250. The network functions included in the control plane 240 are responsible for control functions such as user connection management, quality of service (QOS) policies, performing user authentication, etc. The network functions in the user plane 250 deal with data traffic. As shown, the network functions included in the control plane 240 are NSSF 202, NEF 204, NRF 206, PCF 208, UDM 210, AF 212, NSSAF 214, AUSF 216, AMF 218, SMF 220, and SCP 222. The user plane 250 includes the UPF 224. As shown in FIG. 2, UPF 224 manages data connectivity between the UE 140 and the data network 130 which is also part of the user plane 250.

Some of the key network functions of the 5G core network 116 will now be described.

NSSF 202 is a control plane function within 5G core network 116 and supports functions for network slicing.

NEF 204 supports exposure of network functions capabilities in the 5G network to external network functions such as 3rd party application functions.

NRF 206 is used for service discovering of network functions and allows every network function to discover the service list offered by other network functions in the 5G core network 116.

PCF 208 provides policy rules to control plane functions (e.g. AMF) to enforce them and accesses subscription information relevant for policy decisions in a Unified Data Repository (UDR).

UDM 210 in charge of creating the credentials needed for authentication, granting access depending on user subscription, and sending those credentials to the other network functions. It retrieves the credentials from the UDR. Different key 5G features are supported by the UDM network function. In order to complete the authentication process, it creates authentication credentials. Based on user subscriptions, it approves network access and roaming.

AUSF 216 is responsible to handle authentication requests for both, 3GPP access and untrusted non-3GPP access.

AMF 218 is a key control plane component and has a large number of responsibilities including Registration management, Connection management, Reachability management, Mobility Management, Access Authentication, Access Authorization.

SMF 220 primarily handles session management.

SCP 222 is responsible for message forwarding and routing to destination network function.

UPF 224 is responsible for routing and forwarding user plane data packets between gNB 114 and external data network 130. It handles downlink packet buffering and downlink data notification triggering. UPF 224 may also act as an anchor point for Intra-/Inter-RAT mobility when applicable.

The UE 140 may connect to the home network 110 using a 5G attach procedure defined in the 3GPP standards for connecting a UE 140 to a 5G core network 116. The 5G attach procedure includes the UE 140 first registering with the 5G core network 116. Once the UE 140 is successfully registered with the 5G core network 116, the UE 140, as part of the 5G attach procedure, then establishes a data session that allows the UE 140 to exchange data with the data network 130. The registration with the 5G core network 116 may be referred to as connecting to/registering with the control plane 240 of the 5G core network 116 and the establishing the data session may be referred to as connecting to/registering with the user plane 250 of the 5G core network 116. To establish a data session (e.g., after successfully registering with the 5G core network 116), the UE 140 (e.g., as part of the 5G attach procedure) sends a PDU (Protocol Data Unit) Session Establishment Request message to the 5G core network 116 (e.g., specifically to the Session Management Function, SMF 220). This message includes the UE's data session requirements, Session and Service Continuity (SSC) Mode, Protocol Configuration Options (PCO), external data network 130 etc. The SMF 220 processes the PDU Session Establishment Request and allocates the necessary resources for the data session. The SMF 220 sends a PDU Session Establishment Accept message to the UE 140, which contains the PDU session configuration information, such as the allocated QoS and the IP address. The UE 140 is now ready for data transmission over the established PDU session.

In some cases, PDU session establishment may fail because of a number of reasons including, but not limited to insufficient resources, missing or unknown data network 130, unknown PDU session type, failed user authentication, network failure, and unsubscribed service option. When the PDU session establishment fails, the 5G core network 116 returns a PDU Session Establishment Reject message (e.g., instead of a PDU Session Establishment Accept message) to the UE 140 indicating that a data session was not established. This means that while the UE 140 is registered with the 5G core network 116, the UE 140 is still unable to exchange data with the data network 130. In accordance with present 3GPP 5G NR standards, when the UE 140 is able to successfully register with the 5G core network 116 but is unable to establish a data session (e.g., received a PDU Session Establishment Reject message from the 5G core network 116), the UE 140 is configured to still determine that 5G network coverage associated with the 5G network (e.g., home network 110) is available. For example, a smart phone that was successfully registered with the 5G core network 116 of the home network 110 determines that network coverage associated with the home network 110 is available (e.g., the smart phone displays signal bars indicating available network coverage). However, since no data session was established, the UE 140 is unable to exchange data, for example, with the data network 130. In accordance with present 3GPP 5G NR standards, a UE 140 is configured to handover to a roaming network 120 only when the UE's home network 110 is unavailable (i.e., the UE 140 is unable to register with the home network 110 as part of the 5G attach procedure). But, when the UE 140 successfully registers with the home network 110, the UE 140 is configured to determine that the home network 110 coverage is available (even though a PDU session failed to establish) and thus handover to the roaming network 120 is not triggered. This puts the UE 140 in an exception state where the UE 140, in spite of being registered with the 5G core network 116, cannot access the data network 130 (due to failed PDU session establishment) and cannot handover to the roaming network 120 (as the UE 140 is still registered with the home network 110). Present 5G NR standards do not define procedures to bring the UE out of this exception state.

Embodiments of the present disclosure describe techniques to handle an exception state when the UE 140 successfully registers with the 5G core network 116 as part of the 5G attach procedure but is thereafter unable to establish a PDU session. As described in more detail below, when the UE 140, while registered with the 5G core network 116 associated with the home network 110, detects that the UE 140 does not have a data connection to the data network 130, the UE 140 may be configured to connect to (e.g., handover to) the roaming network 120. This may allow the UE 140 to access the data network 130 via the roaming network 120. While connected to the roaming network 120, the UE 140 may be configured to periodically attempt to re-connect to the home network 110 using the 5G attach procedure and switch back to the home network 110 when the UE 140 successfully registers with the 5G core network 116 and further successfully completes the PDU session establishment (e.g., receives a PDU Session Establishment Accept message from the 5G core network 116).

As described above, the 5G attach procedure includes the UE 140 first registering with the 5G core network 116, and once the registration is successful (e.g., upon receiving a Registration Complete message from the 5G core network 116), initiating a PDU session establishment procedure by transmitting a PDU Session Establishment Request message to the 5G core network 116. Referring back to FIG. 1, after receiving a Registration Complete message (not shown) from the 5G core network 116, the UE 140 transmits a PDU Session Establishment Request message 142 to the 5G core network 116 to establish a data session that allows the UE 140 to exchange data with the data network 130. When the PDU session establishment procedure fails for whatever reason, the 5G core network 116 transmits a PDU Session Establishment Reject message 144 to the UE 140 indicating that the requested PDU session failed to establish. The reception of the PDU Session Establishment Reject message 144 indicates to the UE 140 that the UE 140 does not have a data connection with the data network 130 via the UPF 224. In response to receiving the PDU Session Establishment Reject message 144 from the 5G core network 116, the UE 140 may be configured to start a timer 150, and in conjunction, initiate a connection to the roaming network 120. The timer 150 may be configured to expire after a pre-configured time period. In one embodiment, the timer 150 may include the T3450 timer defined in the 3GPP 5G standards. Initiating a connection to the roaming network may include initiating a handover procedure defined in the 3GPP 5G standards to switch a UE 140 from a source network (e.g., home network 110) to a target network (e.g., roaming network 120). In embodiment, upon receiving a PDU Session Establishment Reject message 144 for a first time, the UE 140 may be configured to re-attempt to establish the PDU session a pre-configured number of times before starting the timer 150 and handing over to the roaming network 120. In this context, the UE 140 may be configured to start the timer 150 and handover to the roaming network 120 after receiving the PDU Session Establishment Reject message 144 a pre-configured number of times.

The UE 140 may be configured to use the timer 150 to implement periodic attempts to switch back to the home network 110. For example, in response to detecting that the timer 150 has expired, the UE 140 may be configured to initiate a connection procedure to connect back to the home network 110. The connection procedure to connect back to the home network 110 may include re-initiating the 5G attach procedure from scratch to re-connect to the home network 110. In one embodiment, the connection procedure to connect back to the home network 110 may include initiating a handover procedure defined in the 3GPP 5G standards to handover the UE 140 from the roaming network 120 to the home network 110 which may include initiating the 5G attach procedure at the home network 110. If the attach procedure fails again, the UE 140 may be configured to reset the timer 150 and continue to maintain the connection with the roaming network 120. For example, if the UE 140 is still unable to establish a PDU session (e.g., again receives a PDU Session Establishment Reject message 144), the UE 140 resets the timer 150 and continues to remain connected with the roaming network 120. The UE 140 may be configured to attempt to re-connect to the home network 110 every time the timer 150 expires and reset the timer 150 and maintain the connection with the roaming network 120 when the attach procedure fails again. The UE 140 maintains connection with the roaming network 120 until an attempt to connect back to the home network 110 is successful. For example, the UE 140 switches back to the home network 110 when the 5G attach procedure is fully successful including receiving a PDU Session Establishment Accept message from the 5G core network 116. Thus, the above-described procedure allows the UE 140 to switch to the roaming network 120 when a PDU session cannot be established in the home network 110, and then switch back to the preferred home network 110 as soon as a PDU session can be established in the home network 110. Switching to the roaming network 120 allows the UE 140 to avoid being in the exception state described above and further avoids interruption in data service. Further, switching back to the home network 110 as soon as a data session can be established in the home network 110 allows the UE minimize connection time with the roaming network and to avail of the higher level of service (e.g., higher data rates) and/or cheaper service provided by the preferred home network 110.

In one or more embodiments, the UE 140 may be configured to transmit to the 5G core network 116 information relating to the cell the UE 140 was connected to when the UE 140 received the PDU Session Establishment Reject message 144. The information transmitted by the UE 140 may include, but is not limited to, one or more of a physical cell identifier (PCI) associated with the cell, a network latitude and a network longitude associated with the cell, and an absolute radio frequency channel number (ARFCN) associated with the cell. The information transmitted to the 5G core network 116 may allow the identification and resolution of an error that caused failure of the PDU session establishment for the UE 140. In one embodiment, the UE 140 may be configured to transmit the above noted information to the 5G core network 116 in response to receiving the PDU Session Establishment Reject message 144 from the 5G core network 116.

Figure 3:
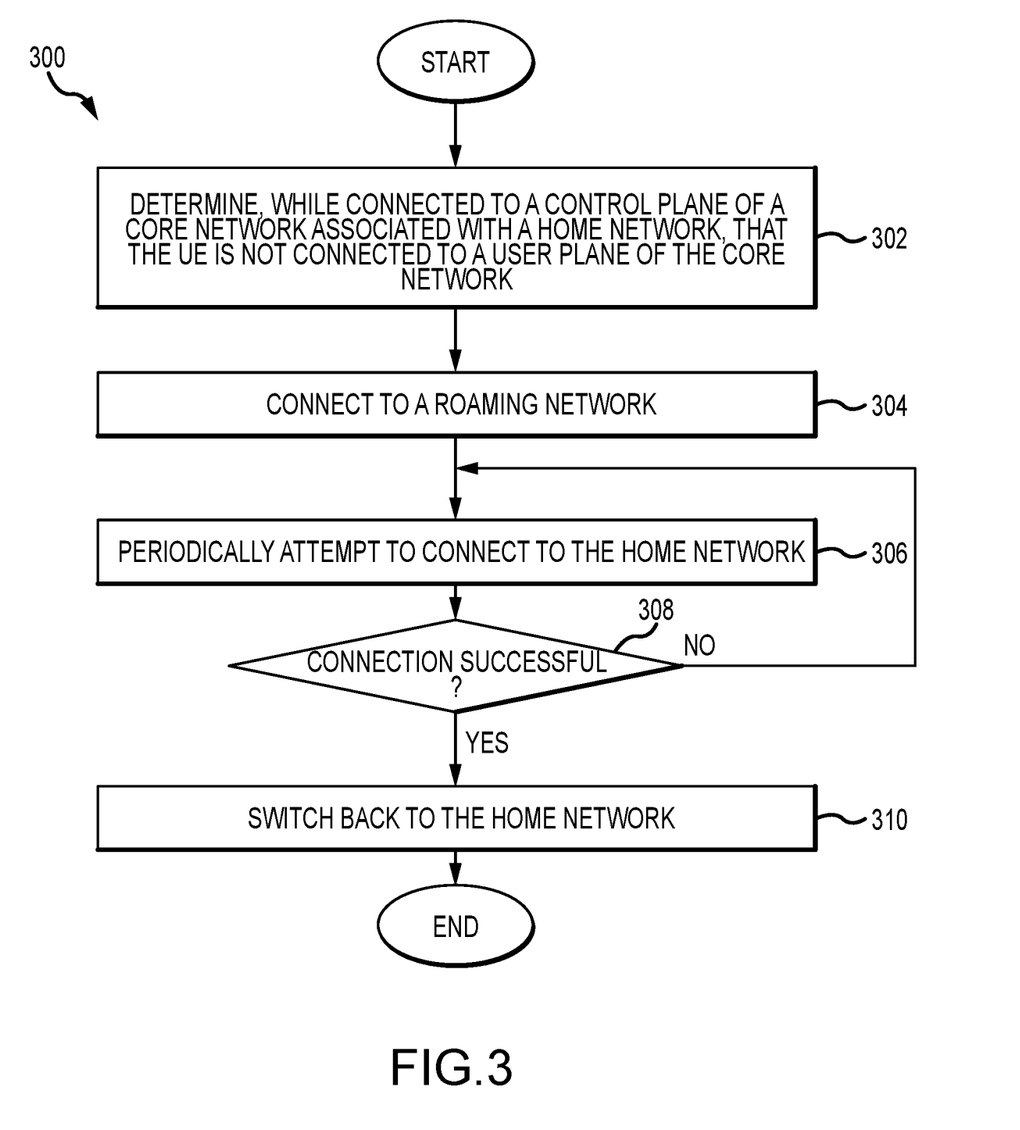
FIG. 3 is a flowchart of an example method for dynamically switching between a home network and a roaming network, in accordance with embodiments of the present disclosure.

FIG. 3 is a flowchart of an example method 300 for dynamically switching between a home network 110 and a roaming network 120, in accordance with embodiments of the present disclosure. Method 300 may be performed by the UE 140 as shown in FIG. 1 and described above.

At operation 302, the UE 140 determines, while connected to a control plane 240 of the core network (e.g., 5G core network 116) associated with the home network 110, that the UE 140 is not connected to a user (or data) plane 250 of the core network 116.

As described above, the UE 140 may connect to the home network 110 using a 5G attach procedure defined in the 3GPP standards for connecting a UE 140 to a 5G core network 116. The 5G attach procedure includes the UE 140 first registering with the 5G core network 116. Once the UE 140 is successfully registered with the 5G core network 116, the UE 140, as part of the 5G attach procedure, then establishes a data session that allows the UE 140 to exchange data with the data network 130. The registration with the 5G core network 116 may be referred to as connecting to/registering with the control plane 240 of the 5G core network 116 and the establishing the data session may be referred to as connecting to/registering with the user plane 250 of the 5G core network 116. To establish a data session (e.g., after successfully registering with the 5G core network 116), the UE 140 (e.g., as part of the 5G attach procedure) sends a PDU (Protocol Data Unit) Session Establishment Request message to the 5G core network 116 (e.g., specifically to the Session Management Function, SMF 220). This message includes the UE's data session requirements, Session and Service Continuity (SSC) Mode, Protocol Configuration Options (PCO), external data network 130 etc. The SMF 220 processes the PDU Session Establishment Request and allocates the necessary resources for the data session. The SMF 220 sends a PDU Session Establishment Accept message to the UE 140, which contains the PDU session configuration information, such as the allocated QoS and the IP address. The UE 140 is now ready for data transmission over the established PDU session.

In some cases, PDU session establishment may fail because of a number of reasons including, but not limited to insufficient resources, missing or unknown data network 130, unknown PDU session type, failed user authentication, network failure, and unsubscribed service option. When the PDU session establishment fails, the 5G core network 116 returns a PDU Session Establishment Reject message (e.g., instead of a PDU Session Establishment Accept message) to the UE 140 indicating that a data session was not established. This means that while the UE 140 is registered with the 5G core network 116, the UE 140 is still unable to exchange data with the data network 130. In accordance with present 3GPP 5G NR standards, when the UE 140 is able to successfully register with the 5G core network 116 but is unable to establish a data session (e.g., received a PDU Session Establishment Reject message from the 5G core network 116), the UE 140 is configured to still determine that 5G network coverage associated with the 5G network (e.g., home network 110) is available. For example, a smart phone that was successfully registered with the 5G core network 116 of the home network 110 determines that network coverage associated with the home network 110 is available (e.g., the smart phone displays signal bars indicating available network coverage). However, since no data session was established, the UE 140 is unable to exchange data, for example, with the data network 130. In accordance with present 3GPP 5G NR standards, a UE 140 is configured to handover to a roaming network 120 only when the UE's home network 110 is unavailable (i.e., the UE 140 is unable to register with the home network 110 as part of the 5G attach procedure). But, when the UE 140 successfully registers with the home network 110, the UE 140 is configured to determine that the home network 110 coverage is available (even though a PDU session failed to establish) and thus handover to the roaming network 120 is not triggered. This puts the UE 140 in an exception state where the UE 140, in spite of being registered with the 5G core network 116, cannot access the data network 130 (due to failed PDU session establishment) and cannot handover to the roaming network 120 (as the UE 140 is still registered with the home network 110).

When the PDU session establishment procedure fails for whatever reason, the 5G core network 116 transmits a PDU Session Establishment Reject message 144 to the UE 140 indicating that the requested PDU session failed to establish. The reception of the PDU Session Establishment Reject message 144 indicates to the UE 140 that the UE 140 does not have a data connection with the data network 130 via the UPF 224. Thus, the UE 140 may determine that the UE 140 is not connected to the user plane 250 of the 5G core network 116 in response to receiving the PDU Session Establishment Reject message 144 from the 5G core network. 116.

At operation 304, in response to determining that the UE 140 is not connected to the user plane of the core network 116, the UE 140 connects to the roaming network 120.

As described above, in response to receiving the PDU Session Establishment Reject message 144 from the 5G core network 116, the UE 140 may be configured to start a timer 150, and in conjunction, initiate a connection procedure to connect to the roaming network 120. The UE 140 connects to the roaming network 120 when a connection procedure is successful. The timer 150 may be configured to expire after a pre-configured time period. In one embodiment, the timer 150 may include the T3450 timer defined in the 3GPP 5G standards. Initiating a connection to the roaming network may include initiating a handover procedure defined in the 3GPP 5G standards to switch a UE 140 from a source network (e.g., home network 110) to a target network (e.g., roaming network 120). In embodiment, upon receiving a PDU Session Establishment Reject message 144 for a first time, the UE 140 may be configured to re-attempt to establish the PDU session a pre-configured number of times before starting the timer 150 and handing over to the roaming network 120. In this context, the UE 140 may be configured to start the timer 150 and handover to the roaming network 120 after receiving the PDU Session Establishment Reject message 144 a pre-configured number of times.

At operation 306, while connected to the roaming network 120, the UE 140 periodically attempts to connect back to the home network 110.

At operation 308, the UE 140 checks whether the attempt to connect back to the home network 110 was successful. Upon determining that the attempt was not successful, the UE 140 maintains the connection with the roaming network 120 and continues to periodically attempt to connect back to the home network at operation 306. On the other hand, upon determining that the attempt to connect back to the home network 110 was successful, the method 300 proceeds to operation 310 where the UE 140 switches back to the home network 110.

As described above, the UE 140 may be configured to use the timer 150 to implement periodic attempts to switch back to the home network 110. For example, in response to detecting that the timer 150 has expired, the UE 140 may be configured to initiate a connection procedure to connect back to the home network 110. The connection procedure to connect back to the home network 110 may include re-initiating the 5G attach procedure from scratch to re-connect to the home network 110. In one embodiment, the connection procedure to connect back to the home network 110 may include initiating a handover procedure defined in the 3GPP 5G standards to handover the UE 140 from the roaming network 120 to the home network 110 which may include initiating the 5G attach procedure at the home network 110.

If the attach procedure fails again, the UE 140 may be configured to reset the timer 150 and continue to maintain the connection with the roaming network 120. For example, if the UE 140 is still unable to establish a PDU session (e.g., again receives a PDU Session Establishment Reject message 144), the UE 140 resets the timer 150 and continues to remain connected with the roaming network 120. The UE 140 may be configured to attempt to re-connect to the home network 110 every time the timer 150 expires and reset the timer 150 and maintain the connection with the roaming network 120 when the attach procedure fails again. The UE 140 maintains connection with the roaming network 120 until an attempt to connect back to the home network 110 is successful. For example, the UE 140 switches back to the home network 110 when the 5G attach procedure is fully successful including receiving a PDU Session Establishment Accept message from the 5G core network 116. In other words, the UE switches back to the home network 110 only when the UE 140 successfully connects to the control plane 240 as well as the user plane 250 associated with the 5G core network 116.

In one or more embodiments, the UE 140 may be configured to transmit to the 5G core network 116 information relating to the cell the UE 140 was connected to when the UE 140 received the PDU Session Establishment Reject message 144. The information transmitted by the UE 140 may include, but is not limited to, one or more of a physical cell identifier (PCI) associated with the cell, a network latitude and a network longitude associated with the cell, and the New Radio absolute radio frequency channel number (NARFCN) associated with the cell. The information transmitted to the 5G core network 116 may allow the identification and resolution of an error that caused failure of the PDU session establishment for the UE 140. In one embodiment, the UE 140 may be configured to transmit the above noted information to the 5G core network 116 in response to receiving the PDU Session Establishment Reject message 144 from the 5G core network 116.

Figure 4:
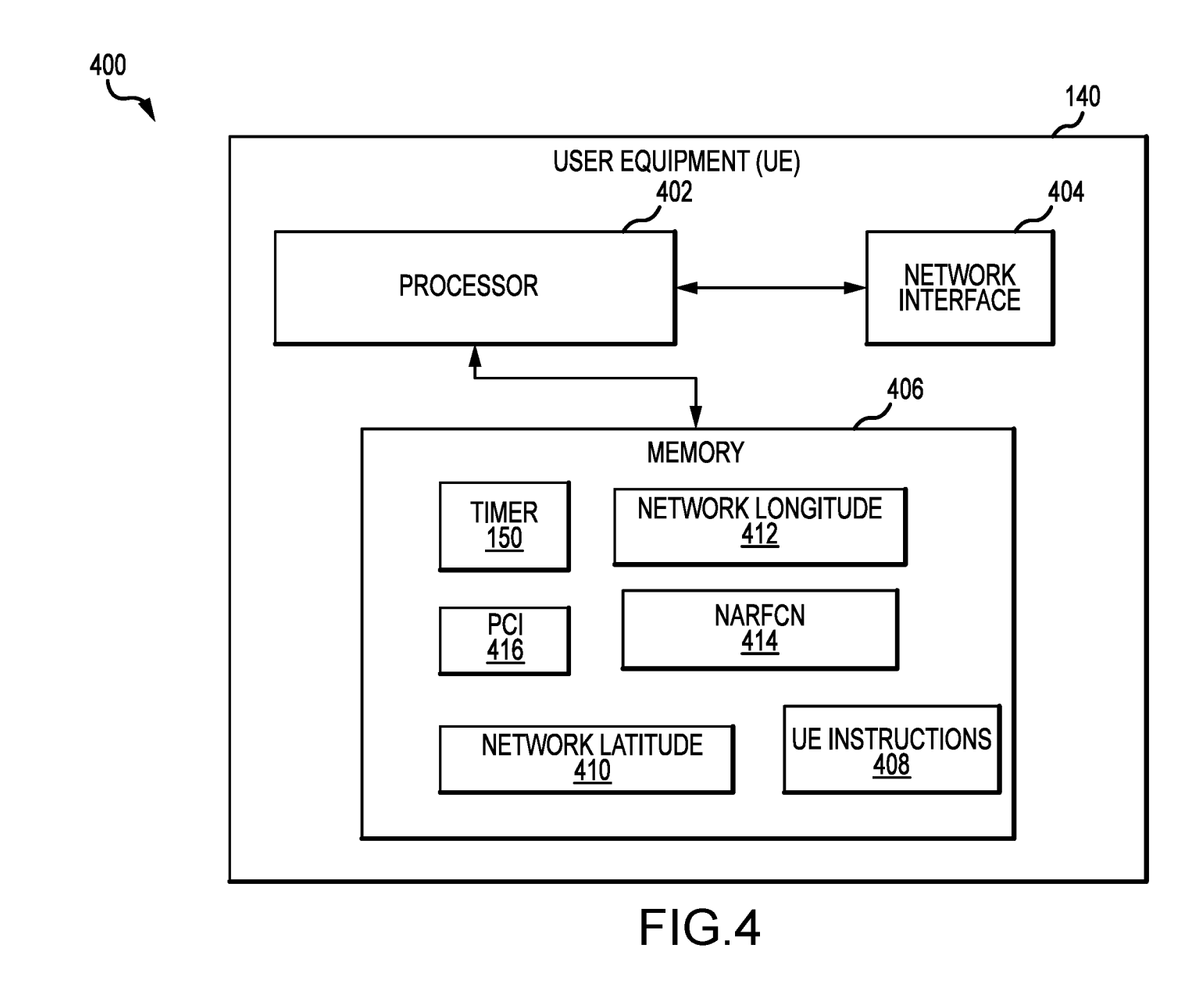
FIG. 4 illustrates an example schematic diagram of the UE illustrated in FIG. 1, in accordance with one or more embodiments of the present disclosure.

FIG. 4 illustrates an example schematic diagram of the UE 140 illustrated in FIG. 1, in accordance with one or more embodiments of the present disclosure.

UE 140 includes a processor 402, a memory 406, and a network interface 404. The UE 140 may be configured as shown in FIG. 4 or in any other suitable configuration.

The processor 402 comprises one or more processors operably coupled to the memory 406. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 406. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute software instructions (e.g., UE instructions 408) to implement the UE 140. In this way, processor 402 may be a special-purpose computer designed to implement the functions disclosed herein. In one or more embodiments, the UE 140 is implemented using logic units, FPGAs, ASICs, DSPs, or any other suitable hardware. The UE 140 is configured to operate as described with reference to FIGS. 1-3. For example, the processor 402 may be configured to perform at least a portion of the method 300 as described in FIG. 3.

The memory 406 comprises one or more disks, tape drives, or solid-state drives, and may be used as an over-flow data storage device, to store programs when such programs are selected for execution, and to store instructions and data that are read during program execution. The memory 406 may be volatile or non-volatile and may comprise a read-only memory (ROM), random-access memory (RAM), ternary content-addressable memory (TCAM), dynamic random-access memory (DRAM), and static random-access memory (SRAM).

The memory 406 is operable to store a PCI 416 associated with the cell of the home network 110 the UE 140 is connected to, a network latitude 410 and a network longitude 412 associated with the cell, the NARFCN 414 associated with the cell, and the UE instructions 408. The UE instructions 408 may include any suitable set of instructions, logic, rules, or code operable to execute the UE 140.

The network interface 404 is configured to enable wired and/or wireless communications. The network interface 404 is configured to communicate data between the UE 140 and other devices, systems, or domains (e.g. one or more gNBs 114 associated with RAN 112). For example, the network interface 404 may comprise a Wi-Fi interface, a LAN interface, a WAN interface, a modem, a switch, or a router. The processor 402 is configured to send and receive data using the network interface 404. The network interface 404 may be configured to use any suitable type of communication protocol as would be appreciated by one of ordinary skill in the art.

One or more of the network functions NSSF 202, NEF 204, NRF 206, PCF 208, UDM 210, AF 212, NSSAF 214, AUSF 216, AMF 218, SMF 220, SCP 222 and UPF 224 provided by the 5G core network 116 may be implemented similar to the UE 140 as shown in FIG. 4. For example, one or more of these network functions may be implemented by a computer processor that executes instructions stored in a memory to implement the one or more network functions.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
    a home network comprising:
        a Radio Access Network (RAN) comprising at least one base station; and
        a core network comprising one or more computer processors configured to implement a plurality of network functions associated with signaling and data communication for the home network;
    a roaming network different from the home network; and
    a User Equipment (UE) subscribing to the home network and the roaming network, wherein the UE connects to the home network via the RAN, and wherein the UE comprises a memory and a processor communicatively coupled to the memory and configured to:
        determine, while connected to a control plane of the core network, that the UE is not connected to a user plane of the core network;
        in response to determining that the UE is not connected to the user plane of the core network, connect to the roaming network;
        while connected to the roaming network, periodically attempt to connect to the home network, wherein attempting to connect to the home network comprises attempting to connect to the control plane and the user plane of the core network; and
        switch back to the home network upon successfully connecting to the control plane and the user plane of the core network.

2. The system of claim 1, wherein the control plane of the core network comprises one or more computer processors configured to implement at least an access and mobility management function (AMF) of the core network.

3. The system of claim 1, further comprising:
    a data network communicatively coupled to the home network and the roaming network;
    wherein:
        the user plane of the core network comprises one more computer processors configured to implement at least a user plane function (UPF) of the core network;
        the UPF connects the UE to the data network; and
        the processor is further configured to determine that the UE is not connected to the user plane of the core network by detecting that the UE is not connected to the data network via the UPF.

4. The system of claim 3, wherein the processor is configured to determine that the UE is not connected to the data network in response to detecting that the UE failed to establish a protocol data unit (PDU) session with the UPF, wherein the PDU session corresponds to a data session for the UE within the home network.

5. The system of claim 4, wherein the processor is configured to detect that the UE failed to establish the PDU session with the UPF in response to receiving a PDU session establishment reject message from the core network.

6. The system of claim 1, wherein the processor is further configured to:
- in response to determining that the UE is not connected to the user plane of the core network, initiate a timer;
- initiate a connection to the roaming network in conjunction with initiating the timer; and
- in response to detecting that the timer has expired, initiate a connection procedure to connect to the home network.

7. The system of claim 6, wherein the processor is further configured to:
- determine that the connection procedure to connect to the home network has failed;
- in response to determining that the connection procedure to connect to the home network has failed, restart the timer; and
- maintain the connection with the roaming network.

8. The system of claim 6, wherein the connection procedure to connect to the core network comprises an attach procedure defined for connecting to $5^{th}$ generation (5G) networks.

9. The system of claim 1, wherein the processor is further configured to:
- transmit to the home network one or more of a physical cell identifier (PCI) associated with the RAN, a network latitude associated with the RAN, a network longitude associated with the RAN, and a new radio absolute radio frequency channel number (NARFCN) associated with the RAN.

10. The system of claim 1, wherein the RAN comprises a $5^{th}$ generation (5G) RAN and the core network comprises a 5G core network.

11. A method for operating a User Equipment (UE), comprising:
- determining, while connected to a control plane of a core network associated with a home network, that the UE is not connected to a user plane of the core network, wherein the home network comprises:
  - a Radio Access Network (RAN) comprising at least one base station;
  - the core network comprising one or more computer processors configured to implement a plurality of network functions associated with signaling and data communication for the home network, wherein the UE connects to the core network via the RAN;
- in response to determining that the UE is not connected to the user plane of the core network, connecting to a roaming network that is different from the home network;
- while connected to the roaming network, periodically attempting to connect to the home network, wherein attempting to connect to the home network comprises attempting to connect to the control plane and the user plane of the core network; and
- switching back to the home network upon successfully connecting to the control plane and the user plane of the core network.

12. The method of claim 11, wherein:
- the user plane of the core network comprises one or more computer processors configured to implement at least a user plane function (UPF) of the core network; and
- the UPF connects the UE to a data network; and
- further comprising determining that the UE is not connected to the user plane of the core network by detecting that the UE is not connected to the data network via the UPF.

13. The method of claim 12, wherein determining that the UE is not connected to the data network is in response to detecting that the UE failed to establish a protocol data unit (PDU) session with the UPF, wherein the PDU session corresponds to a data session for the UE within the home network.

14. The method of claim 11, further comprising:
- in response to determining that the UE is not connected to the user plane of the core network, initiating a timer;
- initiating a connection to the roaming network in conjunction with initiating the timer; and
- in response to detecting that the timer has expired, initiating a connection procedure to connect to the home network.

15. The method of claim 14, further comprising:
- determining that the connection procedure to connect to the home network has failed;
- in response to determining that the connection procedure to connect to the home network has failed, restarting the timer; and
- maintaining the connection with the roaming network.

16. A non-transitory computer-readable medium for operating a User Equipment (UE), wherein the computer-readable medium stores instructions which when executed by a processor cause the processor to:
- determine, while connected to a control plane of a core network associated with a home network, that the UE is not connected to a user plane of the core network, wherein the home network comprises:
  - a Radio Access Network (RAN) comprising at least one base station;
  - the core network comprising one or more computer processors configured to implement a plurality of network functions associated with signaling and data communication for the home network, wherein the UE connects to the core network via the RAN;
- in response to determining that the UE is not connected to the user plane of the core network, connect to a roaming network that is different from the home network;
- while connected to the roaming network, periodically attempt to connect to the home network, wherein attempting to connect to the home network comprises attempting to connect to the control plane and the user plane of the core network; and
- switch back to the home network upon successfully connecting to the control plane and the user plane of the core network.

17. The non-transitory computer-readable medium of claim 16, wherein:
- the user plane of the core network comprises one or more computer processors configured to implement at least a user plane function (UPF) of the core network;
- the UPF connects the UE to a data network; and
- the instructions further cause the processor to determine that the UE is not connected to the user plane of the core network by detecting that the UE is not connected to the data network via the UPF.

18. The non-transitory computer-readable medium of claim 17, wherein determining that the UE is not connected to the data network is in response to detecting that the UE failed to establish a protocol data unit (PDU) session with the UPF, wherein the PDU session corresponds to a data session for the UE within the home network.

19. The non-transitory computer-readable medium of claim 16, wherein the instructions further cause the processor to:

in response to determining that the UE is not connected to the user plane of the core network, initiate a timer;

initiate a connection to the roaming network in conjunction with initiating the timer; and in response to detecting that the timer has expired, initiate a connection procedure to connect to the home network.

20. The non-transitory computer-readable medium of claim 19, wherein the instructions further cause the processor to:

determine that the connection procedure to connect to the home network has failed;

in response to determining that the connection procedure to connect to the home network has failed, restart the timer; and maintain the connection with the roaming network.

* * * * *